Feb. 15, 1944.     I. JEPSON     2,342,077
ELECTRIC COOKING APPLIANCE
Filed Dec. 9, 1940     2 Sheets-Sheet 1
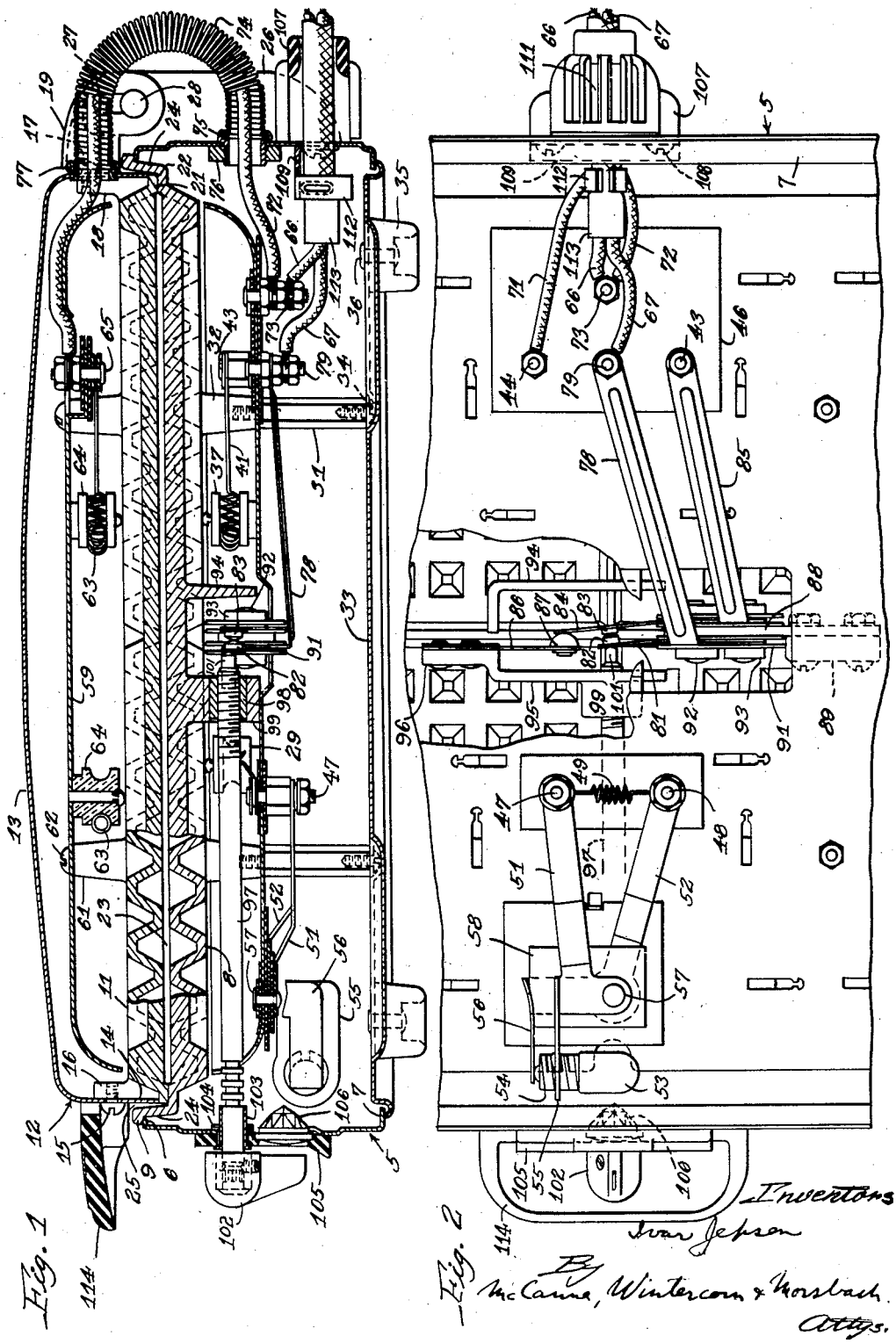

Feb. 15, 1944.  I. JEPSON  2,342,077
ELECTRIC COOKING APPLIANCE
Filed Dec. 9, 1940   2 Sheets-Sheet 2
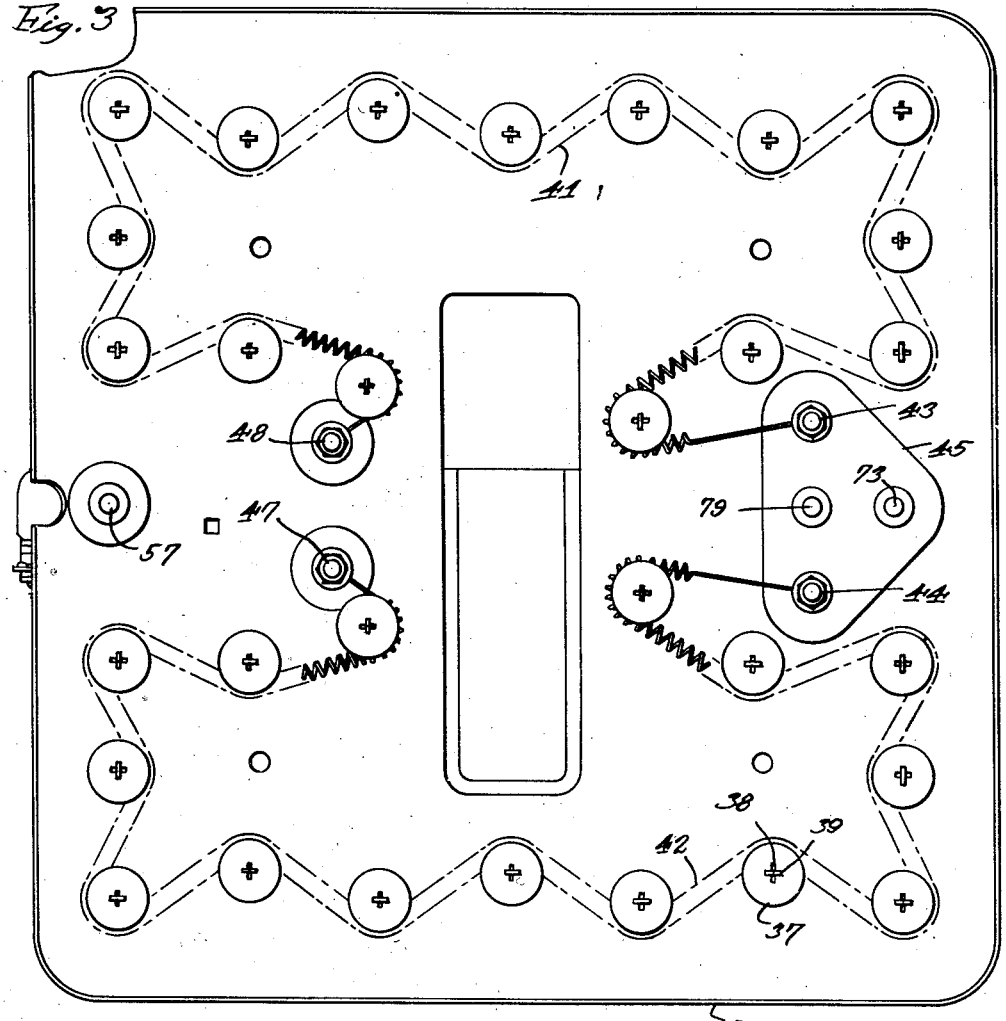
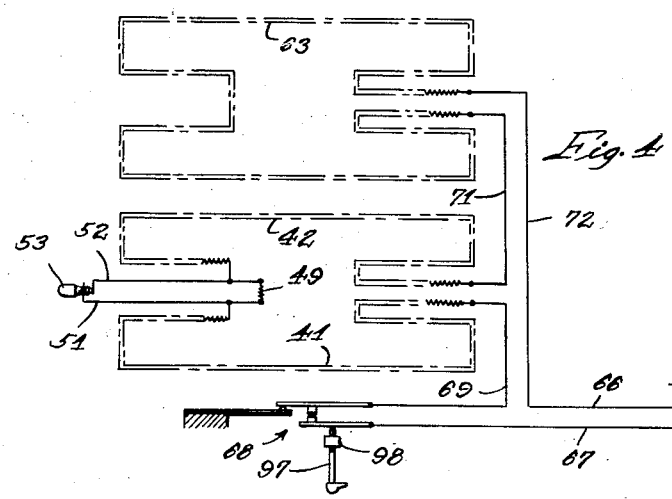

Patented Feb. 15, 1944

2,342,077

UNITED STATES PATENT OFFICE 2,342,077

ELECTRIC COOKING APPLIANCE

Ivar Jepson, Chicago, Ill., assignor to Chicago Flexible Shaft Company, Chicago, Ill., a corporation of Illinois Application December 9, 1940, Serial No. 369,182

8 Claims. (Cl. 219—19)

The invention relates to improvements in electric cooking appliances such as those referred to as waffle irons or bakers commonly used for baking waffles but adapted for other cooking purposes.

One of the objects of this invention is to provide a generally improved electric cooking appliance adapted for cooking functions such as are performed with a grid or grill, and it has more particular reference to waffle baking appliances of the type having a thermostatic switch for controlling the cooking period. To this end the invention aims to provide certain novel features of construction economical to manufacture, dependable in operation, and easy to service. These construction features will be described more particularly hereinafter.

Another object of the invention is to provide a thermostatic control for regulating the temperature of the grid plates of the baker, which is so shielded and arranged that it is directly responsive to the temperature of the grid plates and substantially insensitive to the direct radiation from the heating element and from convection currents.

Still another object of the invention is to provide a simplified means for mounting the elements of the thermostat, including the lead members and the manual control means, to a portion of one of the grid plates.

In devices having an electric heating element, such as an electric waffle baker, the cord supplying the current must be maintained below a predetermined temperature in order to comply with various safety standards. When a conventional cord-support cap or terminal box is used in abutment with the case of the baker where the cord enters the baker, it has been found that the cord will become excessively hot and thereby increase the fire hazard. It is, therefore, another object of the invention to provide a cap having cooling means to prevent development of excessive cord heat.

The invention is illustrated in the accompanying drawings, in which—

Figure 1 is a vertical section through a waffle baker embodying the invention;

Fig. 2 is a fragmentary bottom view of the baker with the bottom cover removed;

Fig. 3 is a top elevation of the reflector plate and the heating element therein; and Fig. 4 is a diagram of the circuit in the invention.

Referring to the drawings, 5 is a lower case of a substantially square shape having inwardly rolled flange portions 6 and 7 at its upper and lower edge, respectively. A lower grid 8 having quadrants containing like grid designs is mounted on the case 5 across the top thereof in a spaced relation from the plane of the lower edge of the case 5. An outwardly extending shoulder 9 supports the grid 8 on the flange 6 of the case 5 to hold it firmly within the said case 5. A top grid 11 is supported on a one-piece upper case 12 having a crown-shaped top panel 13 and depending side walls 14. The grid 11 is secured firmly to the front portion of the top case by a pair of screws 15 which enter through the case 12 into corresponding bosses 16 integral with the grid 11. At the rear of the grid 11, Gullmite screws 17 are entered into two pairs of bosses 18 which are integral with the grid 11, the screws 17 also serving to fasten a pair of upper hinge members 19 (only one shown) to the rear side wall 14 of the case 12. The hinge members 19 have integral, outwardly splayed portions on each side thereof which abut the case 12, the screws 17 being inserted therethrough.

In the embodiment here shown for purpose of illustration, the inner portion of the upper grid is identical with that of the lower grid and is disposed immediately above it when the upper case 12 is lowered into the baking position on the lower case 5. In this position a peripheral flange 21 of the upper grid rests upon a shoulder portion 22 of the grid to maintain a spacing 23 between the upward and downward projections of the respective lower and upper grids. A lip 24 integral with the lower grid extends upwardly from the periphery thereof to a substantial depth, preferably approximating the depth of the upper grid, as shown. This acts as a batter-retaining wall to restrain the batter from overflowing onto the outer surface of the case 5. Batter located between the grids will expand as it becomes heated through the grids, and as a consequence will tend to force itself out from between the shoulder 22 and the peripheral flange 21. However, such escaping batter will merely rise in the upright retaining trough 25 provided by the lip 24 where it will become hardened by the heat to prevent further upward movement of overflowing batter and to define a definite pattern at the marginal edge of the waffle. Even if an excessive amount of batter is introduced between the grids its overflow will be restricted in the same manner, that is, by a seal of hardened batter being formed of a confined and definite shape about the inner side of the lip 24. The grid structure here disclosed is the subject matter of an application for patent of William F. Bisley, Serial No. 491,431, filed June 19, 1943; and it should be understood that in the practice of my invention any suitable or desired grid structure may be used.

The hinge members 19 are mounted on a corresponding pair of hinge plates 26 which are secured to the lower case 5 by lugs integral with the plates 26. These lugs are inserted through holes in the case 5 and upset against a backing plate on the inner side thereof. In the closed position, relative upward and downward movement of the top case 12 with respect to the lower case 5 is permitted by slots 27 in the plates 26 in which the pins 28 ride upwardly and downwardly. This movement allows the top grid to move upwardly in response to the expansion of the baking waffle to enlarge the space 23, the weight of this top case assembly providing the desired pressure on the waffle during the baking period.

A reflector plate 29 having curved, upwardly extending side walls is positioned in a parallel spaced relation beneath the bottom grid, being secured by stud bolts 31 which enter into depending bosses 32 integral with said grid. A bottom plate 33 encloses the bottom of the cases, being attached thereto by screws 34 which enter into the lower ends of studs 31. Four feet 35 of a hardened rubber composition are secured by rivets 36 at the four corners of the bottom plate 33 to support the waffle baker in a raised relation from the surface of a table to prevent burning or scorching of the table surface.

As is illustrated in Fig. 3, a heating element consisting of a coiled wire is mounted on insulator buttons 37 spaced about the reflector plate 29. Each insulator button 37 has a center slot 38 adapted to receive a supporting pin struck up from the plate 29 and integral therewith. The head 39 of each pin is twisted at a right angle to the slot 38 to secure the button in position on the reflector plate. The heating element for the plate 29 is composed of two identical sections 41 and 42 which are connected in series, as illustrated in Fig. 4. Terminals 43 and 44 of a conventional design are mounted on a triangular-shaped mica insulator 45, an additional mica insulator 46 being mounted on the opposite side of the plate 29. The heating element sections terminate at the posts 47 and 48. Electrical connection between the two sections of this element consists of a lamp shunt resistance 49 and a lamp circuit consisting of bus bars 51 and 52 and a signal lamp bulb 53. Both of these connections are located on the under side of the plate 29, as shown by Fig. 2. The threaded base 54 of the lamp bulb is screwed into a socket member 55 integral with the bus bar 51 and at right angles thereto. In this position the rear end of the bulb makes contact with a spring contact 56 integral with the bus bar 52. The forward ends of the bus bars 51 and 52 are secured to the plate 29 by a common rivet 57, being insulated from one another by a mica piece 58.

A reflector plate 59 similar in construction to the plate 29 is mounted in a parallel spaced relation above the top grid 11 and is supported on bosses 61 that are integral with the top grid 11. Screws 62 rigidly secure the plate 59 to the bosses 61. A heating element 63 is mounted on buttons 64 in the same manner as the heating element sections 41 and 42. The pattern of this element with respect to the buttons 64 and the plate 59 is substantially the same as that shown in Fig. 3. The element 63 has its termini in a pair of posts 65 which are secured to the plate 59. As is clear from Fig. 4, power is supplied to the elements through leads 66 and 67, the series circuit for both the upper and lower heating elements consisting of a thermally controlled switch generally referred to as 68, lead 69, element section 41, bar 51, bulb 53 and resistance 49, bar 52, element section 42, a lead 71, element 63, and a lead 72. Power lead 66 connects with lead 72 at a terminal 73. Leads 71 and 72 are flexibly shielded in a coiled spring 74 that assumes a semi-circular shape when the top case 12 of the baker is in a lowered position. Thus, the spring 74 does not interfere with the lowering and raising of the top case portion of the baker and yet affords protection for the leads therein. The ends of the spring 74 are secured to the respective case 5 and top case 12 by a threaded guide 75 that fastens in a nut 76, while the other end of the spring 73 is held within a crimped annulus 77.

The thermostatic switch 68 controls the series circuit that energizes both heating element sections 41 and 42. Power from the lead 67 is conducted through a bus bar 78 that acts as a conductor between a terminal 79 and a switch contact blade 81. The thermostat circuit is closed by contacts 82 and 83 carried by switch blades 81 and 84, respectively. The switch blade 84 is connected with a bus bar 85 that acts as a conductor to the terminal 43 to which one end of the grid element section 41 is connected. A bimetallic blade 86 having a porcelain button 87 on its free end brakes contact between the contact points 82 and 83 when the heat of the grid 8 reaches a predetermined temperature. The bus bars 78 and 85, together with the switch blades 81 and 84, are supported as a unit of assembly on a bracket 88 which is detachably mounted on a lug 89. Mica insulators 91 are positioned on each side of the right angle end portions of the bus bars 78 and 85 to insulate them from the bracket 88. Rivets 92 and washers 93 securely fasten the assembly, consisting of the mica insulators 91, the end portions of the bus bars 78 and 85, and the contact leaves 81 and 84 to the bracket 88. The bimetallic blade 86 is partially enclosed by a wall structure extending downwardly from the lower grid 8, being integral therewith. One section of this wall has an angular shaped portion 94, while the other has a portion 95 to one end portion 96 of which the bimetallic blade 86 is riveted. The wall sections 94 and 95 provide a means for shielding the blade 86 from the surrounding heating element sections 41 and 42 and from the convection currents set up beneath the lower grid during operation, making the latter more directly sensitive to the temperature of the grid. Through this means, the thermostat will break the contact between contact points 82 and 83 when the lower grid reaches a predetermined temperature to control the cooking period and the degree to which the waffle is to be baked. By reason of this shielding wall structure the bimetallic blade 86 will be less disposed to respond to convection currents set up beneath the lower grid, in particular during the preheating stages when the case 5, bottom cover 33, and other parts of the baker are changing temperature at a greater rate than the grid. When batter is poured into the preheated grids, the lower grid will be immediately cooled to a temperature below the baking range. It is necessary then that the bimetallic blade 86 does not break the contacts 82 and 83 until the lower grid has returned to the predetermined baking temperature. By providing the shielding wall structure the bimetallic blade 86 will be less disposed to respond to the heat radiating from the element sections 41 and 42 and the reflector plate 29, which would undergo only a slight temperature change in comparison to the lower grid upon the introduction of the batter. Consequently, by this means the sensitivity of the bimetallic blade 86 to the temperature of the lower grid is increased in the invention during the operating stages of the baker, whereby the constancy of the grid temperature is better maintained.

An adjustment for the thermostat assembly is provided by a means for adjusting the distance between the contact blade 84 and the bimetallic blade 86. To this end, an adjustment rod 97 is rotatably mounted in a transverse relation to the contact blades 81 and 84 in the case 5. The inner end of the rod 97 is threaded for a mounting in a nut 98 that is pressed within a boss 99 integral with the wall member 95. This threaded end of the rod 97 projects beyond the boss 99 and contains a porcelain insulator 101 which engages the contact blade 81. The opposite end of the rod 97 has an adjustment knob 102 secured to an end portion that extends outside the case 5. As the knob 102 is turned through an arc of approximately 180°, the rod 97 will be screwed inwardly to move contact blade 84 a greater distance from the porcelain button 87 in such a manner that the bimetallic blade 86 will have to move a greater distance in response to the grid heat to break the circuit between contacts 82 and 83. A bearing 103 is provided at the outer end of the rod 97 and is secured to the case 5 by a clip 104. The bearing 103 also secures a semi-circular calibrated dial 105 containing an opening for an indicator window 106 that is in registration with the bulb 53. It is clear that when the baker is turned on by plugging the leads 66 and 67 into an electrical circuit, the heating elements will be energized and that the signal lamp 53 will be lighted. When the temperature of the grids has reached a predetermined degree, the blade 86 will break the circuit to the heating elements, thereby turning off the signal lamp. By observing the signal lamp turning off through the indicator window 106, the operator can determine when the grids have reached the predetermined baking temperature required for the introduction of the batter. After supplying the batter, the element circuits are again energized automatically by the thermostat 68. The operator then leaves the batter to bake without attention until the signal lamp again turns off, indicating the restoration of the grid heat to the predetermined temperature, at which time the waffle will be done and ready for serving. During this baking period the thermostat assembly will maintain the grids at a constant temperature to avoid burning and insure the proper temperature for the baking of the waffle. The relative darkness or lightness of the waffle is controlled by the movement of the knob 102 between its extreme positions, in one of which the grid will be maintained at a temperature suitable for light waffles, while in the other for dark waffles, the in-between ranges being for medium baking. The power leads 66 and 67 enter the baker through a box 107 that abuts the case 5, being secured thereto by screws 108 that enter the box 107 through a re-enforcing bracket 109 to prevent undue heating of the cord containing leads 66 and 67 at the point at which it enters the baker case 5. The box 107 is provided with slots 111 in registration on the upper and lower sides thereof. This permits circulation of air through the box and around the cord, whereby the cord is maintained at a temperature that satisfies the requirements of the fire underwriters. In order to prevent strains on the terminals at the baker end of the cord, a clamping means is provided by the clamp members 112 which are struck from the bracket 109. These members 112 clamp the cord at a point having heat resisting insulation 113 so as to relieve the leads from pulling strains.

A pair of oppositely disposed handles are provided on the case 5 on each side of the baker for lifting the complete unit. A third handle 114 of a like low heat conducting composition is secured to the front end of the top case 12, providing a convenient means for raising and lowering the top case assembly during the operating periods.

Among the construction features of the invention will be noted the simple and practical method of mounting the heating elements on the reflector plates; the mounting of the thermostat blade on a lug cast on the under side of the lower grid and the mounting of the contact blades on another lug cast on the under side of the lower grid, the contact blades being preferably a part of an assembly unit which includes terminal bus bars; the rod adjustment of the contact blades; the mounting and arrangement of the signal lamp; and the assembly whereby all of the operating parts associated with the lower grid are mounted and connected from the bottom of the grid. It will be observed that this construction requires but a minimum amount of machine work on the lower grid and that the thermostat parts and switch mechanism, together with the complete connections, are effected in such simple manner as to avoid the necessity of individually mounting or connecting a large number of parts on the lower grid.

While I have shown a particular embodiment of my invention, it will be understood that I do not wish to be limited thereto since many modifications may be made, and I therefore contemplate by the appended claims to cover any such modifications as fall within the true spirit and scope of my invention.

I claim:

1. In an electric cooking appliance, in combination, a grid, a heating element for said grid, a circuit for said heating element, a thermostatic switch in said circuit including a thermostat blade and contact blades biased to circuit closing contact, the grid having lugs on the back thereof, said thermostat blade being fixedly mounted on one of said lugs, an adjusting rod threaded in one of said lugs and coacting with said blades to adjust their relation to the thermostat blade and an assembly unit including said contact blades and terminal connections therefor, said assembly unit being detachably mounted on another of said lugs with the contact blades in coacting relation with said thermostat blade and adapted to be opened and closed by thermal action thereof, said assembly unit being removable and replaceable independently of said thermostat blade and said adjusting rod.

2. In an electric cooking appliance, in combination, a grid, a heating element for heating the grid, a thermostat blade, wall means projecting outwardly from the back to the grid to substantially enclose the thermostat blade arranged to increase its sensitivity to grid temperature and to substantially shield the blade from the heating element, the thermostat blade being fixed at one end to said wall means in good heat conduction therewith in a plane normal to the rear face of the grid, a circuit for the heating element including a pair of contact blades normal to the rear face of the grid and biased for closing the circuit, one of said contact blades arranged in coacting relation with the thermostat blade so as to be operated thereby to open the circuit in response to a predetermined grid temperature, and an adjustment rod threaded through the wall means and arranged to directly coact at its inner end with a switch blade and manually rotatable at its outer end to move the contacting switch blades to a greater or lesser distance relation with respect to the operating end of the thermostat blade whereby the blade contacts will be actuated in response to the grid heat to break the circuit between the blade contacts at higher or lower temperatures according to the setting of said rod.

3. An electric cooking appliance as set forth in claim 2, in which the contact blades are part of a unit of assembly including a bracket detachably mounted on the grid and including bus bars having electrical connection with the contact blades, the bus bars and blades being insulated from said bracket, the thermostat blade and the adjusting rod each having an insulation contact member in coaction with the contact blades, and said unit of assembly being removable from the grid independently of the thermostat blade and the adjusting rod.

4. In an electric cooking appliance, in combination, a grid, a reflector plate mounted at the back of and spaced from the grid, a heating element between the grid and the plate, a thermostat blade, wall means projecting outwardly from the back of the grid to substantially enclose the thermostat blade arranged to increase its sensitivity to grid temperature and to substantially shield the blade from direct radiation from the heating element, the thermostat blade being fixed at one end to said wall means in good heat conduction therewith in a plane normal to the rear face of the grid, a circuit for the heating element including a pair of contact blades located between said wall means normal to the rear face of the grid and biased for closing the circuit, one of said contact blades extending beyond the other and arranged in coacting relation with the thermostat blade so as to be operated thereby to open the circuit in response to a predetermined grid temperature, and an adjustment rod threaded through the wall means and arranged to directly coact at its inner end with the adjacent switch blade and manually rotatable at its outer end to move the contacting switch blades to a greater or lesser distance relation with respect to the operating end of the thermostat blade whereby the blade contacts will be actuated in response to the grid heat to break the circuit between the blade contacts at higher or lower temperatures according to the setting of the rod.

5. An electric cooking appliance as set forth in claim 4, in which the contact blades are part of a unit of assembly including a bracket detachably mounted on the grid and including bus bars having electrical connection with the contact blades, the bus bars and blades being insulated from said bracket, and terminal posts for the heating element extending through and mounted on the reflector plate, said bus bars extending through the reflector plate and connected to said terminal posts at the outer side of said plate.

6. In an electric cooking appliance, in combination, a grid, a reflector plate mounted at the back of and spaced from the grid, a heating element between the grid and the plate, and a circuit for the heating element including terminal posts extending through the plate insulated therefrom and connected at the inner end to the heating element, a bus bar for each terminal post located at the outer side of the reflector plate and connected at one end to its respective terminal post, one bus bar having an outwardly turned portion shaped to provide a lamp socket and the other bus bar having an outwardly turned portion in alignment with said socket to provide a lamp contact, a lamp bulb threaded into said bus bar socket and making contact with said bus bar contact, and a thermostat switch in the circuit including a thermostat member responsive to temperature of the grid to open the circuit at a predetermined temperature.

7. An electric appliance as set forth in claim 6, including a lamp shunt resistance between said terminal posts.

8. In an electric cooking appliance, in combination, a grid, a heating element for heating the grid, a thermostat blade, a side wall structure integral with and projecting outwardly from the back of the grid arranged to provide an enclosure for the thermostat blade to increase its sensitivity to grid temperature and to substantially shield the blade from the heating element, the thermostat blade being fixed at one end to said side wall structure in good heat conduction therewith in a plane normal to the rear face of the grid, a cricuit for the heating element including switch contact blades normal to the rear face of the grid arranged in coacting relation with the thermostat blade so as to be operated thereby to cause opening and closing of the circuit in response to changes in grid temperature, and an adjustment rod threaded through said side wall structure and arranged to directly coact at its inner end with one of said switch blades and manually rotatable at its outer end to move one of said switch blades to a greater or lesser distance relation with respect to the operating end of the thermostat blade whereby said switch blades will be actuated in response to the grid heat to control said heating circuit at higher or lower temperatures according to the setting of said rod.

IVAR JEPSON.